(12) United States Patent
Debs

(10) Patent No.: US 7,374,214 B2
(45) Date of Patent: May 20, 2008

(54) VEHICLE DOOR AND FENDER PROTECTOR

(76) Inventor: Pierre Debs, P.O. Box 56735, Sherman, CA (US) 91413

( * ) Notice: Subject to any disclaimer, the term of this patent is extended or adjusted under 35 U.S.C. 154(b) by 0 days.

(21) Appl. No.: 11/328,710

(22) Filed: Jan. 10, 2006

(65) Prior Publication Data
US 2007/0158963 A1    Jul. 12, 2007

(51) Int. Cl.
*B60R 19/42* (2006.01)
(52) U.S. Cl. ................ 293/128; 296/DIG. 6
(58) Field of Classification Search ........ 293/128, 293/DIG. 6; 280/770
See application file for complete search history.

(56) References Cited

U.S. PATENT DOCUMENTS

| | | | |
|---|---|---|---|
| 3,147,176 A | 9/1964 | Haslam | |
| 4,014,583 A * | 3/1977 | Forbes | 293/128 |
| 4,498,697 A | 2/1985 | McGlone | |
| 4,726,614 A | 2/1988 | Myers | |
| 4,871,205 A | 10/1989 | Bray | |
| 5,072,979 A * | 12/1991 | Swinton | 293/128 |
| 5,188,407 A | 2/1993 | Villaveces | |
| 5,320,392 A | 6/1994 | Hart | |

* cited by examiner

*Primary Examiner*—Dennis H. Pedder
(74) *Attorney, Agent, or Firm*—Michael D. Harris

(57) ABSTRACT

Magnets attach a resilient material protector to the sides of a vehicle. The protector also includes a hook that fits between the vehicle door and the door post to prevent the protector from being removed from the vehicle when the door is locked. The protector has two portions that fold over each other such that the magnets on the respective portions align with each other and secure the portions together in a stowed position. The hook embeds in one portion of the protector and can extend between the vehicle door and its post to secure the protector to the vehicle. A recess opposite the hook in the other portion of the protector receives the hook's free end. The magnets have soft material on their outside to prevent the magnets from scratching the vehicle.

13 Claims, 3 Drawing Sheets

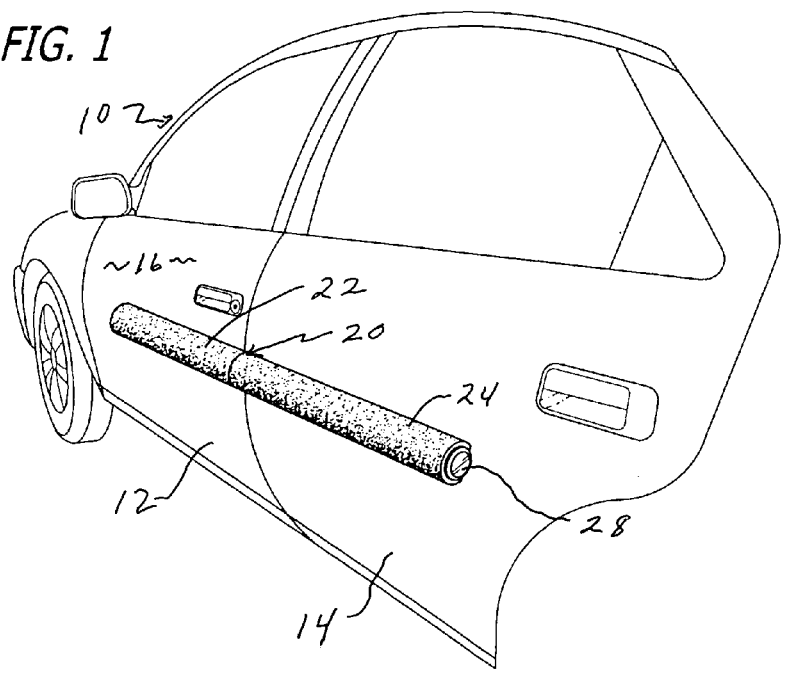
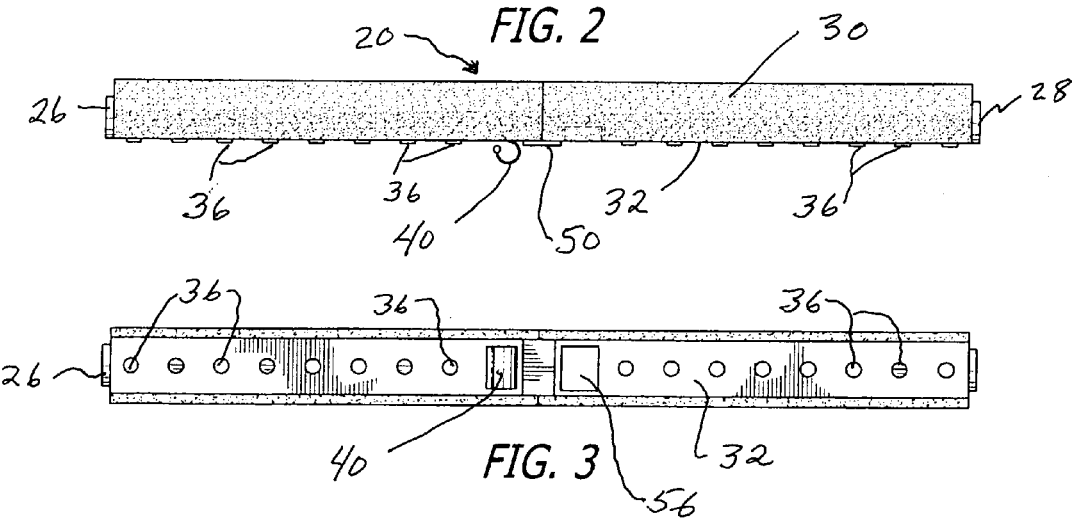

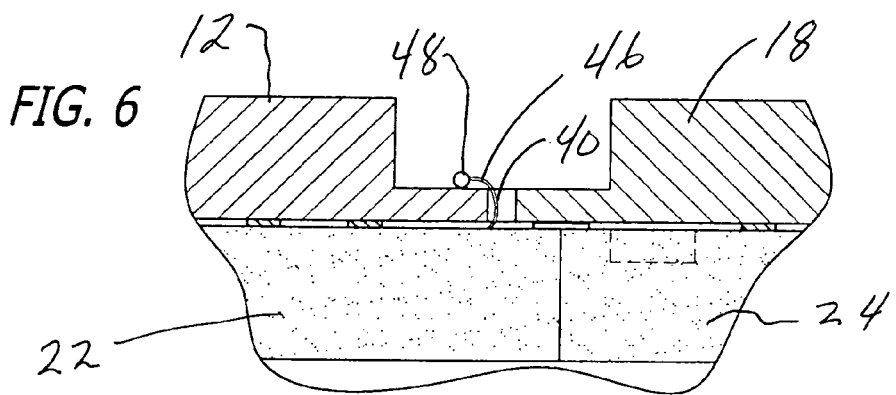
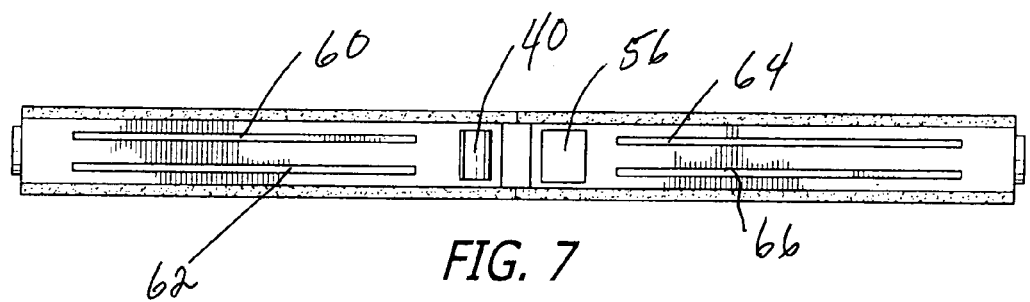
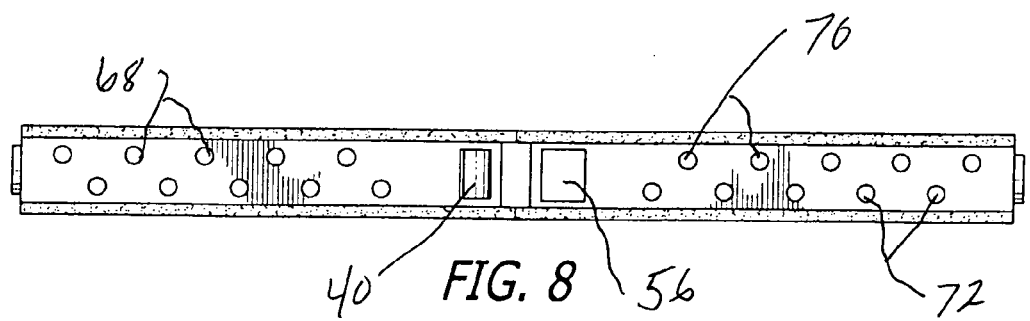

VEHICLE DOOR AND FENDER PROTECTOR

BACKGROUND OF THE INVENTION

1. Field of the Invention

The present invention relates to attachable and removable protectors for preventing nicks, dings and other damages to vehicle doors and panels.

2. General Background and State of the Art

The sides of vehicles suffer damage from contact with other objects. The driver of a vehicle in an adjacent parking space may open his or her door into the vehicle's door or panel. A shopping cart may roll, or a person's luggage or gym bag may strike the door or panel. Even minor contact may cause the panel to dent or the paint to scratch.

For many years, most new vehicles have had built-in rubberized strips attached to their sides. The strips often mount at the widest part of the door and side panels where impact from foreign objects is most likely. Though they vary in shape, length, width and thickness, they often are quite thin. Consequently, they do not project far from the vehicle sides and usually blend into the lines of the vehicle. Therefore, unless a potential damage-causing object aligns with the strip, part of the object may contact the door or panel above or below the strip. Some vehicles advertise panels that resist damage from foreign objects. Nevertheless, scratches and dents remain possible.

To protect customers' vehicles, some parking garages, especially private airport parking garages, hang large pads from the ceiling between adjacent parking spaces. Some garages charge premium rates for those spaces. The pads may be appropriate at airport parking garages because one frequently must open vehicle doors wide to put luggage in a rear or front passenger seat. The very act of moving luggage or luggage carts can cause contact with adjacent vehicles. Nevertheless, hanging large pads is not a practical form of protection for most situations.

The prior art teaches several vehicle protectors. Usually made of resilient material and thick enough to provide more protection than the built-in side strip, they are portable for carrying with the vehicle. Some have magnets to hold the protector to the steel side of a vehicle. The following U.S. Pat. Nos.: Haslam, No. 3,147,176 (1964), McGlone, No. 4,498,697 (1985); Myers, No. 4,726,614 (1988); Bray, No. 4,871,205 (1989); Villaveces, No. 5,188,407 (1993); and Hart No. 5,320,392 (1994), are examples. Some protectors attach with suction cups, but they can dislodge and may affect the vehicle surface.

If magnets or suction cups are the only attaching device, thieves can steal the protectors easily. To solve the theft problem, some prior art patents have a hook secured to the protector that fits between the vehicle door and the door post. The user closes the door on the hook so that the hook is captured between the door and the door post. McGlone, Myers, Bray and Villaveces are examples. Because the user can lock the door, thieves who cannot open the door cannot remove the protector without damaging it. Thus, the hook may prevents thieves from removing the protector and using it on their vehicles.

Having a long protector covers a larger area of the vehicle, but longer protectors are more awkward to store. The prior art teaches folding protectors for storage.

INVENTION SUMMARY

A foam or other resilient material protector uses magnets to attach to the vehicle. In addition, a hook fits between the vehicle door and the door post to prevent the protector from being removed from the vehicle unless the door is unlocked and opened. The protector is divided into two portions, forward and rearward. In the exemplary embodiment the portions are of equal lengths that fold over each other. The magnets on one portion align with magnets on the other portion to secure the protector in the folded over position. North poles of magnets face outward on one portion to engage South pole magnets on the other portion. Soft material on the magnets or embedding the magnets in the protector prevents the metal magnets from scratching the vehicle.

A hook embeds in one portion of the protector and can extend between the vehicle door and its post to secure the protector to the vehicle. The other portion of the protector has a recess, and the hook rests within the recess when the protector is folded together.

The ends of the protector may have reflective material to provide added visibility to oncoming vehicles.

BRIEF DESCRIPTION OF THE DRAWINGS

FIG. 1 is prospective view of an exemplary embodiment of the vehicle protector of the present invention mounted along the side of a vehicle.

FIG. 2 is a plan view of exemplary embodiment of the vehicle protector of the present invention.

FIG. 3 is a side view of the exemplary embodiment of the vehicle protector of FIG. 2.

FIG. 6 is a plan section showing an exemplary embodiment of the vehicle protector attached to the vehicle.

FIGS. 7 and 8 are side views of alternate embodiments of the vehicle protector of the present invention.

DETAILED DESCRIPTION OF THE PREFERRED EMBODIMENTS

Figure 4:
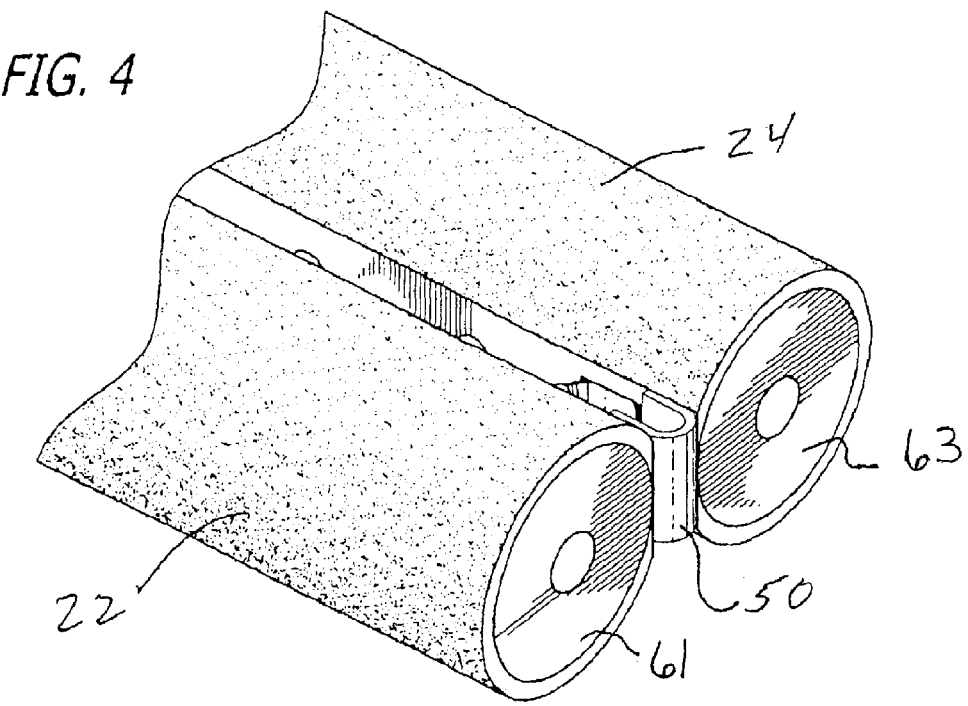
FIG. 4 is a prospective view of an exemplary embodiment of the present invention with the portions of the vehicle protector folded over each other into a stowed orientation.

The vehicle protector of the present invention protects the side of cars, trucks, SUV's and other similar vehicle. FIG. 1 shows the driver's side (left-hand drive) of automobile 10. The automobile is a four door sedan with two of the doors 12 and 14 on the driver's side. As is typical, doors 12 and 14 are slightly convex so that a region beginning at about 16 on front door 12 and extending rearward projects farther out than other parts of the door or fenders. This region 16 that projects outward is particularly vulnerable to damage from doors of adjacent vehicles and other objects such as shopping carts and luggage carts in parking lots. Note that although exemplary vehicle 10 has four doors, the vehicle protector of the present invention also works with two door vehicles in which the region behind the front door is not another door.

The protector for the side of a vehicle of the present invention comprises an elongated resilient protector member 20 having a forward portion 22 and a rearward portion 24. They are interchangeable but are called "forward" and "rearward" for identification. In the exemplary embodiment, the protector member is formed of a resilient material such as foam. It is solid in the exemplary embodiment, but it may be hollow. It also could have a solid or cylindrical core of more rigid material surrounded by foam, plastic or other soft material. The exemplary embodiment also may use other materials e as long as they are soft and do not scratch the vehicle finish. Preferably, the material should not absorb water or absorb only a minimal amount because the protector will be exposed to rain and snow.

Each end of the protector may have a reflector 26 and 28 (FIGS. 1-3) that reflects light from oncoming vehicle headlights. The reflectors would also make seeing the protector easier for the driver pulling into an adjacent parking lot space. In place of reflectors, the protector could also have low powered lights or LEDs for warning oncoming traffic. These lights also could flash. The portions of the protector would require means for holding a battery and electrical connectors if powered lights are used.

In the exemplary embodiment, protector 20 has a cylindrical outer surface 30 that terminates in a flat surface 32 (FIGS. 2 AND 3). The flat surface may be referred to as the "proximal surface" because it is adjacent to the vehicle. Though the flat surface may be of a material other than the same foam that forms the rest of the protector, it should be soft so that it does not scratch the surface of the vehicle. Further, though the distal outer surface is cylindrical in the exemplary embodiment, other shapes are acceptable. Rounded surfaces are likely to be more durable, however.

Magnets 36 mount on flat surface 32 (FIGS. 2 AND 3). As FIG. 2 shows, the magnets project outward slightly from the flat surface and beyond where curved outer surface 30 terminates. In the exemplary embodiment, the magnets are covered with a soft felt-like material 38 (FIG. 5) to protect the vehicle surface from hard metal magnets. The magnets also may be recessed within flat surface 32 and covered by material forming the flat surface.

Though surface 30 is not required to be flat, the flat surface allows the magnets to exert more force on the steel sides of the vehicle because all the magnets can be pressed flat against the vehicle. If the entire protector were rounded and lacked a flat or flat-like surface, the protector could pivot more easily about the magnets. Keeping the protector stationary is probably desirable.

If the magnets provided the only attachment holding the protector to the vehicle, thieves could steal the protector easily. Therefore, the present invention has a flexible hook embedded in the protector that can fit between the door and the door post. In the exemplary embodiment, one end 42 of hook 40 is embedded in the resilient protector member. See FIG. 5. A larger end 44, cylindrical in the exemplary embodiment, helps secure the embedded end within the protector member. Securing the hook properly is important so that the hook does not pull out of the protector member. For example, the embedded end 42 could be farther inside the protector. The cylindrical end could be made larger or replaced with a wide, flat end. Additionally, the area of the protector around the hook can be made stronger by adding additional material.

With the protector 20 in a position close to the position shown in FIG. 1, the user opens door 12 slightly and puts the free end 46 of the hook between the door 12 and adjacent door post 18. The user then shuts the door and locks it, which captures hook 40 inside the vehicle. A cylinder or other large end 48 of the hook prevents the hook's removal unless the door is opened.

Figure 5:
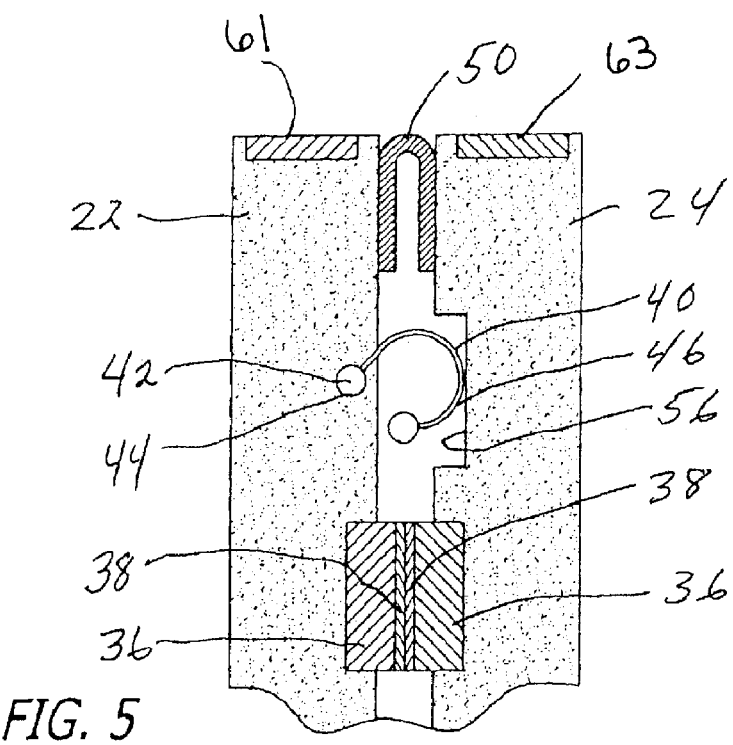
FIG. 5 is a plan sectional view of a portion of the vehicle protector of the present invention shown folded over.

Forward portion 22 and rearward portion 24 of protector 20 fold over each other for storage (FIGS. 4 and 5). Flexible hinge 50 in the exemplary embodiment attaches to the proximal side of the forward and rearward protector members and allows the pivoting of one member with respect to the other. Though the exemplary embodiment uses a flexible member as a hinge, other types of hinges can be used. However, as shown in FIG. 2, hinge 50 is adjacent to the surface of the vehicle. Therefore, it either should be formed of a soft material or should be covered by a material that will not scratch the vehicle's surface.

When the forward and rearward protector members are folded over, magnets on one portion align with the magnets on the other portion. See FIG. 5. Those opposing magnets should have opposite poles on their outsides so that they attach to each other. All the magnets on one portion could have the North pole facing outward, and all the other magnets on the other portion could have South poles facing outward. However, as long as the magnets that contact each other have opposite poles facing each other, the magnets will hold the protector in the stowed position of FIGS. 4 AND 5.

FIGS. 7 and 8 show other arrangements for the magnets. FIG. 7 shows two strip magnets 60 and 62 on one portion and two more strip magnets 64 and 66 on the other portion of the protector member. When the portions are folded over, the strip magnets contact each other such that magnet 60 contacts 64, and magnet 62 contacts magnet 66. Those magnets that ultimately contact each other should have opposite magnetic poles facing outward. The FIG. 8 embodiment is similar to that of FIG. 3. However, the actual arrangements can differ considerably. If one wants the magnets to hold the protector in its stowed condition, at least some of the magnets 68 on the one portion must contact the magnets 72, 76 on the other portion, and magnets that contact each other should have opposite magnetic poles.

The portion of the protector that does not have hook 40 imbedded in it has a recess 56 that provides space for the hook when the protector portions are in their stowed condition. As FIG. 5 shows, recess 56 is opposite where the embedded end of hook 42 is captured within the opposite protector member. Thus, there is room for the hook when the protector is in its stowed condition.

The ends of the forward and rearward protector adjacent hinge 50 also may have embedded magnets 61 and 63 (FIGS. 4 and 5). One of those magnets would have its North pole facing outward and the other magnet would have its South pole facing outward. Alternatively, one of the magnets 60 or 62 could be replaced with a steel ring or plate. When the protector is in its open, deployed position, e.g., FIG. 2, magnets 60 and 62 contact each other and secure the protector in its open position. This makes maneuvering and positioning the protector along the side of the vehicle easier.

While the specification describes particular embodiments of the present invention, those of ordinary skill can devise variations of the present invention without departing from the inventive concept.

I claim:

1. A protector for the side of a vehicle, wherein the side of the vehicle has a door and a door post against which the door closes, the protector comprising:
   a) an elongated resilient protector member having a forward portion and a rearward portion and a hinge for allowing the forward and rearward portions to fold over each other from an open position to a stowed position, each of the forward and rearward portions having a proximal side for being adjacent the side of the vehicle and a distal side facing away from the side of the vehicle;
   b) at least one magnet on the proximal side of each of the forward and rearward portions for attaching the protector member by magnetism to the side of the vehicle, at least one magnet on the forward portion being adjacent at least one magnet on the rearward portion when the forward and rearward portions are folded together about the hinge, each magnet having soft material between the magnet and the side of the vehicle to protect the side of the vehicle from scratches from the magnet;

c) a flexible hook having two ends, one end being attached to the proximal side of one of the portions of the protector member and the other end projecting from the one portion of the protector member, the hook being sufficiently long so that the other end can reach between the door and the door post of the vehicle when the protector member is attached to the side of the vehicle; and d) a recess on the proximal side of the portion of the protector member to which the hook is not attached, the recess being aligned with the connection of the hook to the one of the portions when the forward and rearward portions are folded together.

2. The protector of claim 1 wherein each protector member portion has two ends, a first of the ends being adjacent the hinge and the second of the ends being opposite of the hinge, the protector further comprising at least one reflector on at least one of the second ends.

3. The protector of claim 1 wherein each protector member portion has two ends, a first of the ends being adjacent the hinge and the second of the ends being opposite of the hinge, the protector further comprising a magnet on each of the first ends that are in contact with each other when the protector is in its open position.

4. The protector of claim 1 wherein each of the portions has a plurality of magnets extending along the substantial length of the portion.

5. The protector of claim 1 wherein each of the portions has at least one elongated magnets extending along part of the length of the portion.

6. The protector of claim 1 wherein the proximal side of each portion is generally flat to conform to the side of the vehicle.

7. A protector for the side of a vehicle, wherein the side of the vehicle has a door and a door post against which the door closes, the protector comprising:

a) forward and rearward protector member portions attached together at a hinge and foldable between an open and a stowed position, each of the forward and rearward portions having a proximal side for being adjacent the side of the vehicle and a distal side facing away from the side of the vehicle;

b) at least one magnet on the proximal side of each of the forward and rearward portions for attaching the protector member by magnetism to the side of the vehicle, at least one magnet on the forward portion being adjacent at least one magnet on the rearward portion when the forward and rearward portions are in the stowed position;

c) soft material between the magnet and the side of the vehicle to protect the side of the vehicle from scratches from the magnet;

d) a flexible hook having two ends, one end being attached to the proximal side of one of the portions of the protector member and the other end projecting from the one portion of the protector member, the hook being sufficiently long so that the other end can reach between the door and the door post of the vehicle when the protector member is attached to the side of the vehicle; and e) a recess on the proximal side of the portion of the protector member to which the hook is not attached, the recess being aligned with the connection of the hook to the one of the portions when the forward and rearward portions are folded together.

8. The protector of claim 7 wherein each protector member portion has two ends, a first of the ends being adjacent the hinge and the second of the ends being opposite of the hinge, the protector further comprising at least one reflector on at least one of the second ends.

9. The protector of claim 7 wherein each protector member portion has two ends, a first of the ends being adjacent the hinge and the second of the ends being opposite of the hinge, the protector further comprising a magnet on each of the first ends that are in contact with each other when the protector is in its open position.

10. The protector of claim 7 wherein each of the portions has a plurality of magnets extending along the substantial length of the portion.

11. The protector of claim 7 wherein each of the portions has at least one elongated magnet extending along part of the length of the portion.

12. The protector of claim 7 wherein the proximal side of each portion is generally flat to conform to the side of the vehicle.

13. The protector of claim 7 wherein the soft material is attached to each magnet.

* * * * *